Patented Oct. 11, 1927.

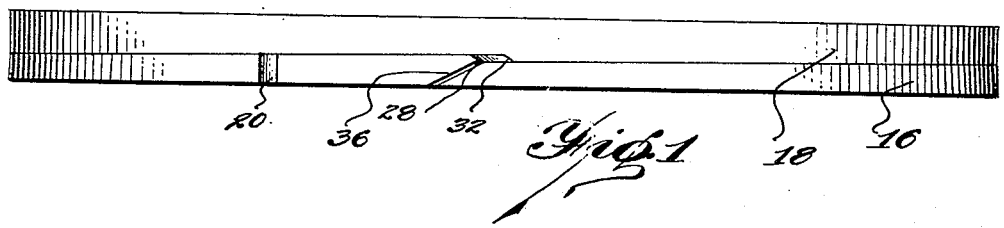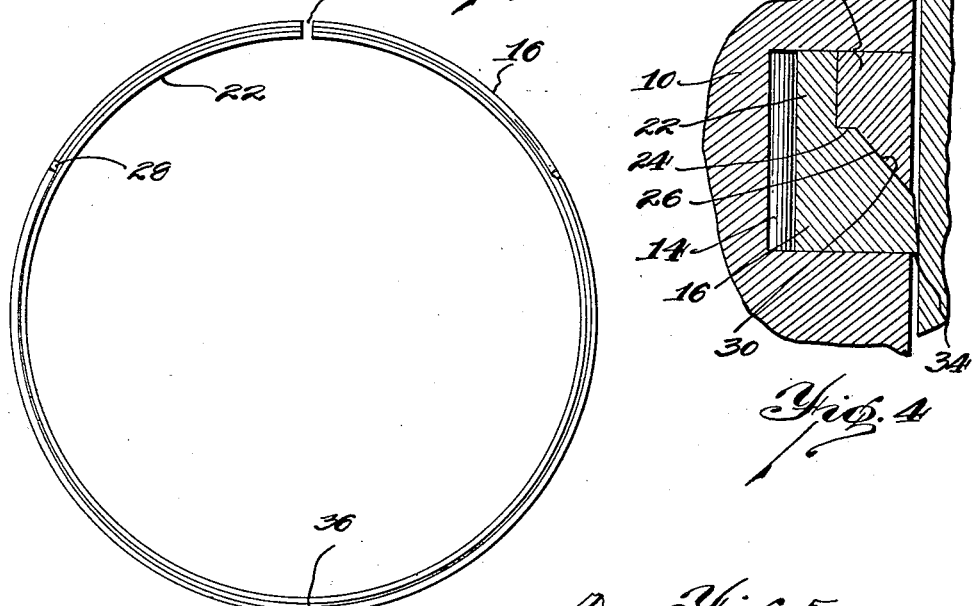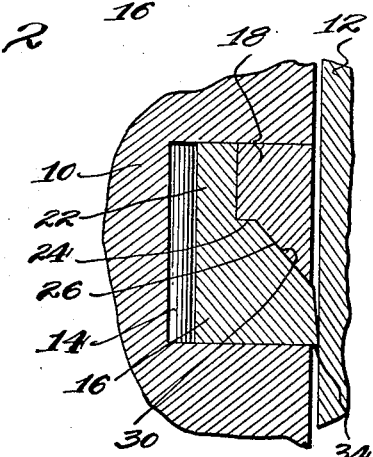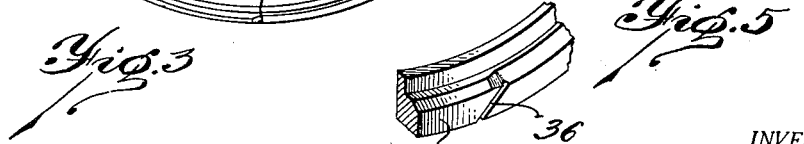

1,644,944

UNITED STATES PATENT OFFICE.

JOHN F. PANYARD, OF DETROIT, MICHIGAN.

PISTON PACKING.

Application filed March 22, 1926. Serial No. 96,532.

My invention relates to improvements in piston packing, particularly to packing characterized by the provision of a packing ring having a helical axial face and being rotatably mounted within a groove in the piston counter a helical meeting face within said groove, whereby upon rotation of the ring in a given direction it is wedged axially within the groove to prevent leakage along its axial faces and wherein means are provided to expand the ring radially against the cylinder within which the piston is mounted for working movement.

The object is to provide piston packing so constructed as to collect lubricant from the cylinder wall during reciprocation of the piston, which lubricant will exert a rotatable impulse on the packing ring tending to wedge the same against the side walls of the groove in the piston within which the piston is mounted. Specifically the ring is provided with a passageway for the admission of lubricant to a pocket wherein it can exert a rotatable impulse upon the ring to produce the wedging action desired. I form such pocket adjacent to an axial face of the ring by providing a ring with a shoulder against which the lubricant exerts a pressure impulse.

A suitable structure possessing merit consists in providing a pair of co-operating wedge ring sections having one or more helical meeting faces terminating in shoulders extending angularly thereto wherein one of the ring sections has a passageway for the admission of lubricant to a space between the rings to exert a rotatable impulse thereon to wedge the rings axially against the side walls of the groove. Such lubricant passageway or passageways may be angularly disposed as illustrated.

I prefer to so build my improved packing that the inner and larger ring section is of expansible material and has a greater normal diameter than the outer and smaller ring section and also is provided with a relatively quick seating cylinder wall engaging face adapted to initially exclusively engage the cylinder wall for a limited period of use. This leaves the smaller and outer ring section free for rotation upon initial installation so that it may respond to the rotatable impulse produced by the lubricant collected in the pocket or pockets between the ring sections.

In the structure shown I provide a larger and inner ring section which has the greater normal diameter with a vent or angularly extending passageway extending across its cylinder wall engaging face from one axial face to the other and terminating in proximity to the shoulder before mentioned.

The objects above set forth together with others of importance and value will more fully appear from a consideration of the following specification and claims together with the drawing illustrating the invention, in which:

Figure 1 is a side elevation of a packing ring embodying my invention.

Fig. 2 is a side elevation of the ring shown in Fig. 1 in which the ring sections are separated one from the other.

Fig. 3 is a plan of the ring structure shown in Fig. 1.

Fig. 4 is a cross-sectional view through my improved ring in position on a piston.

Fig. 5 is a perspective of a fragment of my improved packing.

In the figures of the drawing, let 10 indicate a broken-away portion of a piston and 12 a cylinder wall. The piston is provided with a packing ring groove 14. Within this groove is mounted my improved packing. This packing comprises a pair of co-operating ring sections indicated as 16 and 18. These ring sections are one-piece split ring sections, the split being indicated at 20 in ring section 16. Ring section 18 is not shown in such a manner that the split is visible but it may be split in the same manner as ring section 16. In order to avoid the necessity of employing a third section in the form of an expansible spring, which is a suitable method of operation, if desired, I make ring section 16 of material which carries its own expansion and such section is denominated as an expansible ring section. As shown in the drawing, ring section 16 has a base flange portion 22 which substantially fills the groove in the piston. This base flange terminates in a radial shoulder 24. I have shown the ring section as provided with a plurality of beveled helical faces 26 each of which extends from the shoulder 24 to the outer face of the ring section. In the drawing I have shown three such helical faces though obviously any suitable number might be provided. The helical faces shown terminate in shoulders 28.

Ring section 18 is shaped so as to seat between the helical axial face or faces of ring section 16 and the opposite side wall of the groove in the piston. The ring section 18, therefore, has corresponding helical beveled faces 30 which abut the helical axial faces 26 of ring section 16. These helical faces of ring section 18 also terminate in shoulders 32 which are disposed opposite the shoulders 28 when the ring sections are placed together. The structure is so formed that when the ring sections are properly positioned relative to each other there is a space between the oppositely disposed shoulders.

The ring section 16 is so formed on its outer cylinder wall engaging face as to have a quick seating edge portion 34 greater in diameter than the remainder of the outer face which first engages the cylinder wall to the exclusion of the rest of the packing and quickly wears in a short initial period to find its seat in the cylinder.

The ring section 18 is here shown as a dead ring section, that is, it does not have any inherent expansible tendency and when seated upon the base flange 22 of the ring section 16 it resists the outward pressure of the expansible ring section and thereby reduces the wall pressure which otherwise would be exerted by such ring section 16 against the cylinder.

Ring section 16 has a greater normal diameter than ring section 18 and upon initial installation ring section 18 is normally rotatable within the groove.

Ring section 16 is provided with a vent or passageway 36 which extends from its straight axial face to one of its helical axial faces. This vent preferably extends angularly across the outer face of ring section 16 to a point on the helical axial face in proximity to the shoulder which terminates such face as shown in Fig. 2 of the drawing.

During reciprocation of the piston when the piston is traveling downwardly, lubricant is gathered from the wall of the cylinder and passes through the vent 36 into the space between the shoulders 28 and 32 and the pressure of this entering lubricant tends to rotate the ring section 18 which, at the initial period of installation, is normally free for rotation. The pressure of this entering lubricant wedges this section 18 against the side wall of the groove in the piston and against the axial helical face of ring section 16 so as to wedge the combined packing against the side walls of the groove in the piston, while the ring section 16 due to its inherent expansive character serves to hold the packing outwardly against the cylinder wall.

What I claim is:

1. In piston packing, a piston having a groove for packing, packing in said groove comprising cooperating ring sections having helical meeting faces provided with spaced-apart oppositely disposed shoulders and a vent through one of said sections from the axial face which terminates in the shoulder to the opposite axial face.

2. In piston packing, a piston having a groove for packing, packing in said groove comprising cooperating ring sections having helical meeting faces and a vent through one of said sections from its axial helical face to its outer axial face.

3. In piston packing, a piston having a groove for packing, packing in said groove comprising cooperating ring sections having helical meeting faces provided with spaced-apart oppositely disposed shoulders and a vent through one of said sections from its outer axial face to its axial helical face at a point in proximity to its shoulder.

4. In piston packing, a piston having a groove for packing, packing in said groove comprising cooperating ring sections having helical meeting faces provided with spaced-apart oppositely disposed shoulders and a vent through one of said sections which vent extends over the cylinder wall engaging face of the section at an angle to the axial dimension thereof.

5. In piston packing, a piston having a groove for packing, packing in said groove comprising cooperating ring sections having a plurality of beveled meeting faces terminating in oppositely disposed shoulders and an angularly extending vent through one of said ring sections from a point adjacent to a shoulder to the outer axial face of said ring section.

6. In piston packing, a piston having a groove for packing, packing in said groove comprising cooperating ring sections having beveled meeting faces, one of said ring sections being expansible and having a greater normal diameter than the other and provided with a base flange adapted to serve as a seat for such other ring section, said other ring section being of less diameter and rotatably seated upon the base flange of the first ring section between the helical axial face thereof and the opposite side wall of the groove in the piston, said expansible ring section of greater diameter provided with a passageway extending from its helical axial face to its outer axial face.

7. In piston packing, a piston having a groove for packing, packing in said groove comprising cooperating ring sections having beveled meeting faces, one of said ring sections being expansible and having a greater normal diameter than the other and provided with a base flange adapted to serve as a seat for such other ring section, said other ring section being of less diameter and rotatably seated upon the base flange of the first ring section between the helical axial face thereof and the opposite side wall of the groove in the piston, said expansible ring section of greater diameter provided with a passageway extending from its helical axial face to its outer axial face angularly an axial dimension of the ring section.

8. In piston packing, a piston having a groove for packing, packing in said groove comprising cooperating ring sections having helical meeting faces, one of said ring sections being expansible and having a greater normal diameter than the other and having a base flange the axial dimension of which is approximately the width of the groove, said other ring section of less diameter being rotatably seated upon the base flange of the first section between the helical face of said section and the opposite side wall of the groove and being of such a diameter as to resist the outward expansive force of the first ring section, said first ring section provided with an angular passageway across its outer face extending from its helical axial face to its opposite axial face.

9. In piston packing, a piston having a groove for packing, packing in said groove comprising a pair of co-operating ring sections having a plurality of helical meeting faces terminating in oppositely disposed shoulders so arranged that said shoulders are normally spaced apart from each other, one of said ring sections being expansible and being of greater normal diameter than the other and having a base portion adapted to fit within said other to exert outward radial pressure thereon, said other ring section seated upon said base portion of the first ring section to be held resistingly outwardly by the first ring section, said expansible ring section provided with a restricted vent extending from its helical axial face at a point between said oppositely disposed shoulders of the two ring sections to its outer axial face and being open to the outer surface of the piston.

10. In piston packing, a piston having a groove for packing provided with a helical axial face, a packing ring in said groove having a helical meeting face and a restricted passageway leading from the space between said helical meeting faces to the outer surface of the piston.

In testimony whereof, I sign this specification.

JOHN F. PANYARD.